Jan. 13, 1970   D. R. WESTHOFF   3,489,040
METHOD OF DEEP BORE DRILLING
Filed Aug. 23, 1967   3 Sheets-Sheet 1

INVENTOR
DONALD R. WESTHOFF
BY Gravely, Lieder & Woodruff
ATTORNEYS

Jan. 13, 1970  D. R. WESTHOFF  3,489,040

METHOD OF DEEP BORE DRILLING

Filed Aug. 23, 1967  3 Sheets-Sheet 3

INVENTOR
DONALD R. WESTHOFF
BY
Gravely, Lieder & Woodruff
ATTORNEYS

United States Patent Office
3,489,040
Patented Jan. 13, 1970

1

3,489,040
METHOD OF DEEP BORE DRILLING
Donald R. Westhoff, 1507 S. Rock Hill Road,
Webster Groves, Mo. 63119
Filed Aug. 23, 1967, Ser. No. 662,723
Int. Cl. B23b 35/00
U.S. Cl. 77—5     2 Claims

ABSTRACT OF THE DISCLOSURE

Drilling apparatus and method for forming deep holes in workpieces wherein a suitable adjustable holder for extra long length twist drills and the like is provided so that the drill may be progressively lengthened from its fixed position chuck to expose more of the drill length for penetration into the workpiece as the workpiece is progressively advanced and retracted along the length of the drill to ultimately drill the hole deeper but to withdraw the work before the flutes can choke up with cuttings and cause binding and breakage of the drill.

---

This invention relates to improvements in deep drilling methods and particularly to drilling methods capable of accurately forming very small diameter holes in workpieces by manually manipulating the workpieces toward and away from a drill that is operatively mounted in a substantially fixed position chuck.

A critical and persisting problem exists in successfully and economically forming deep drilled holes in workpieces with equipment set up to hold the workpiece in a stationary attitude and to move the drill toward the workpiece. The limitations in this character of available equipment are quite significant because there is usually far too little room for installing exceptionally long length twist drills without having to move the workpiece during the drill installation. In the latter cases it is seldom that the workpiece is repositioned exactly as it was at the time that the drilling operation was first initiated. Slight imperfections in repositioning the workpiece can, in deep drilling operations, cause drill breakage because of binding as the hole being drilled increases in length. There are many other objections in connection with drilling with currently available apparatus that detract from the ability of such apparatus to successfully form deep holes.

It is an important object, therefore, of the present invention to provide a method of deep drilling that is exceedingly simple and will overcome the foregoing enumerated and other objections.

Another important object of the present invention is to provide deep drilling apparatus with a simple organization of parts and components that will permit precision work to be obtained by methods unique in this class of apparatus.

Yet another object of the present invention is to provide in deep drilling apparatus an arrangement for locating a drill holding and driving chuck in a desired position and for moving the workpiece toward and away from the drill supporting and driving chuck during the drill operation, and to arrange the workpiece supporting means such that a certain manual feel is obtained.

Other objects and advantages of the present invention will be set forth in greater particular in connection with the description of a certain preferred organization of deep drilling apparatus which has been disclosed in the accompanying drawings, wherein.

2

Figure 1:
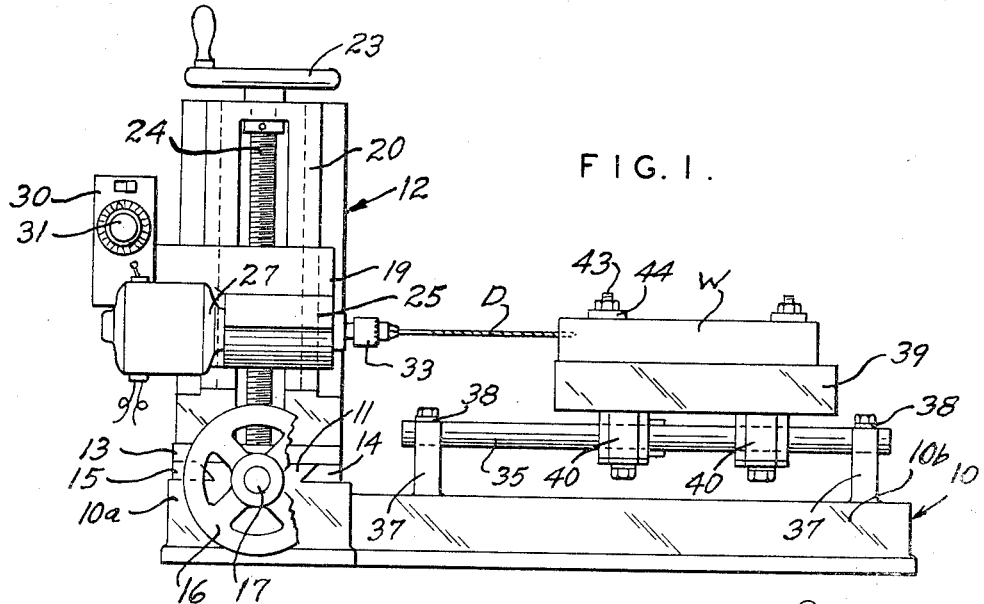
FIG. 1 is a front elevational view of the deep drilling apparatus incorporating the components and organization of components of the present invention.
Figure 3:
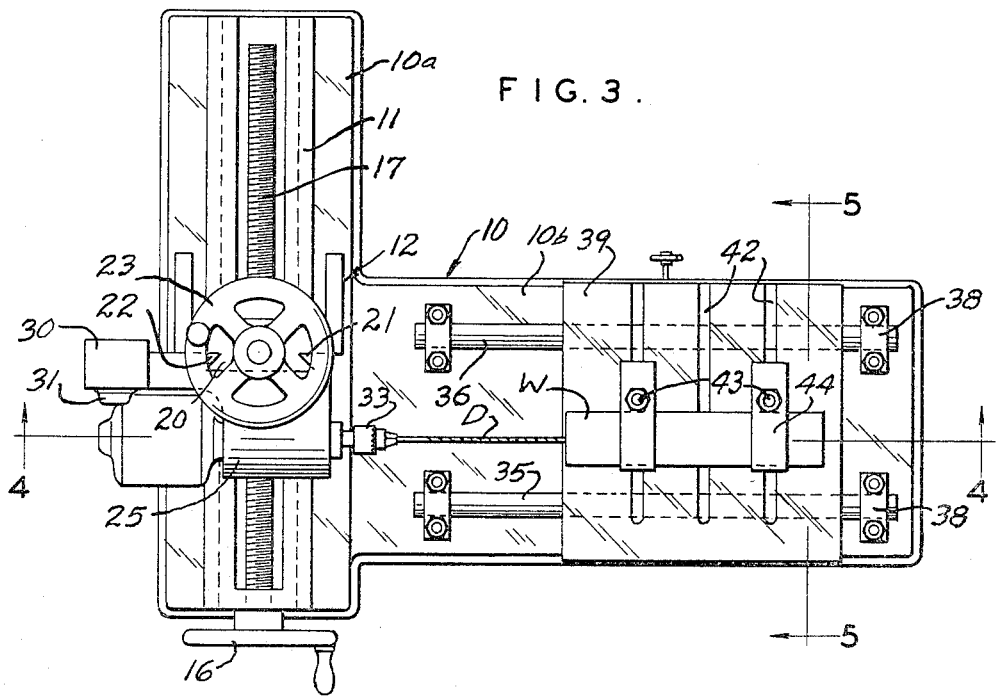
Figure 4:
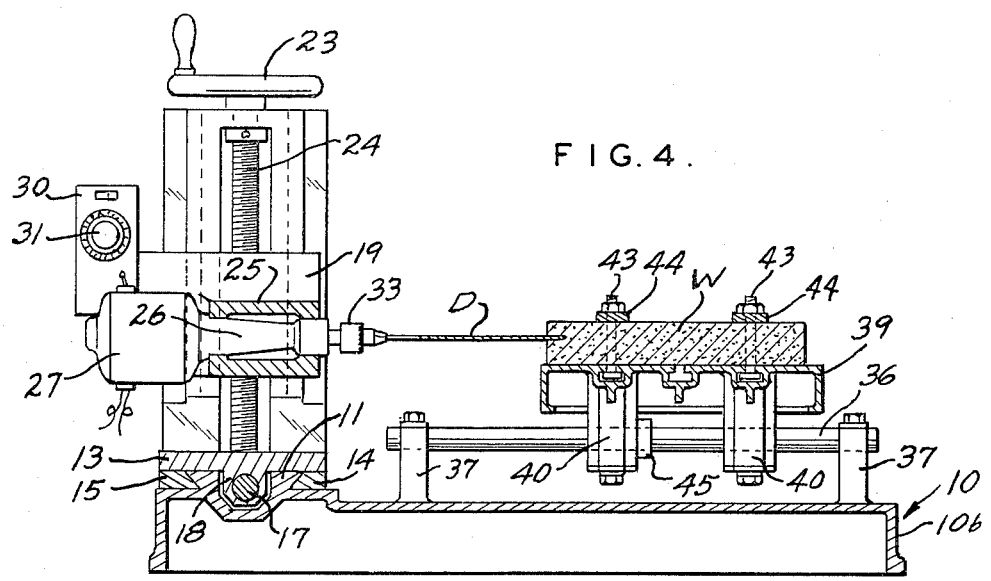
Figure 5:
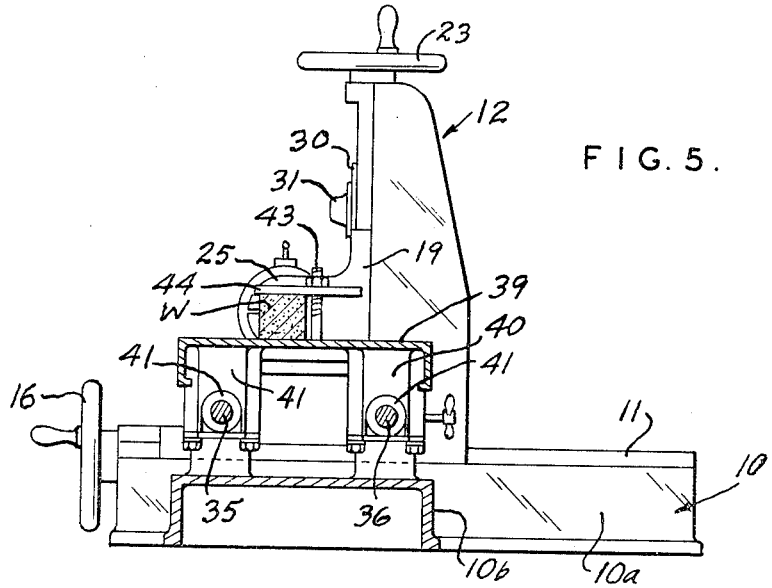
Figure 6:
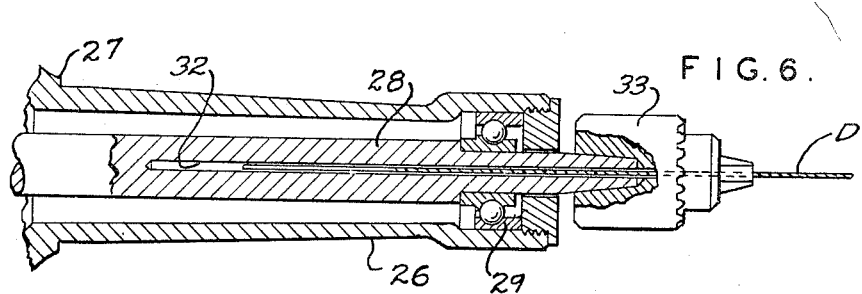
Figure 7:
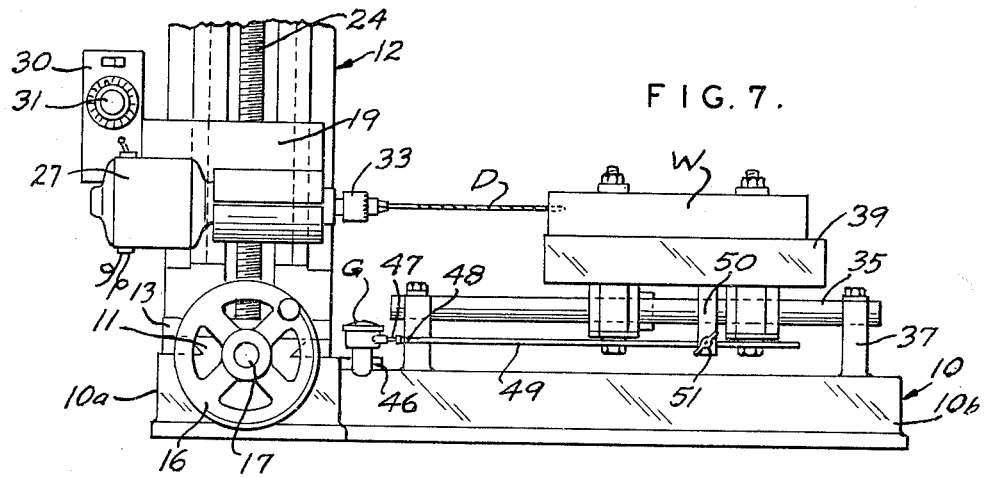

FIG. 3 is a top plan view of the apparatus of FIG. 1;
FIG. 4 is a longitudinal sectional elevational view taken along line 4—4 in FIG. 3;
FIG. 5 is a transverse sectional elevational view at line 5—5 in FIG. 3;
FIG. 6 is a fragmentary and greatly enlarged sectional view through the drill supporting and driving chuck assembly; and
FIG. 7 is a fragmentary view of the apparatus shown in FIG. 1 but disclosing additional components that may be incorporated therein.

Figure 2:
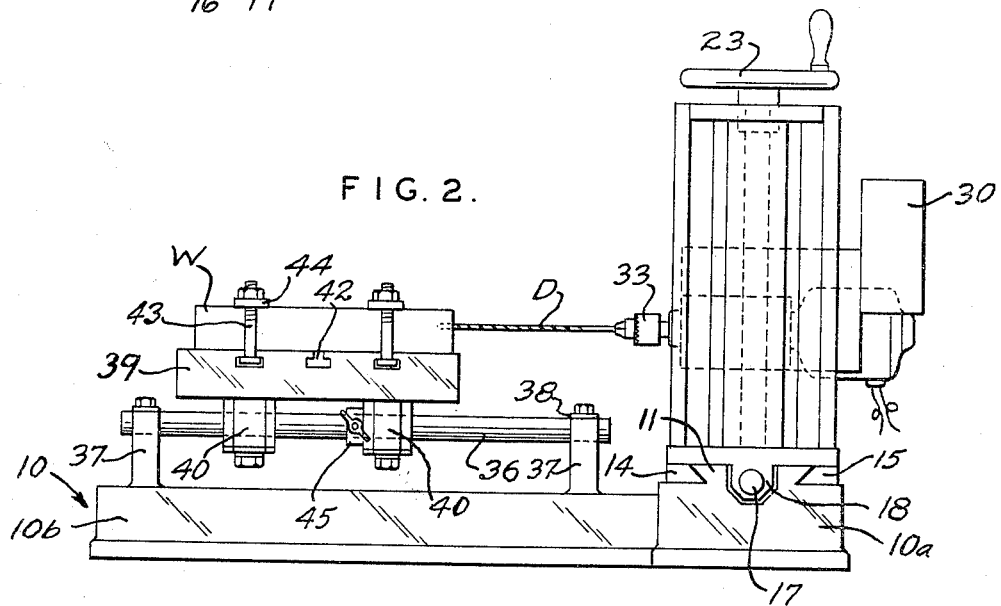
FIG. 2 is a rear elevational view of the apparatus shown in FIG. 1.

Referring now to the drawings and particularly to FIGS. 1, 2, and 3, it can be seen that the drilling apparatus comprises a base 10 of generally L-shape in plan, and the same is provided with a projecting dovetail slideway 11 extending longitudinally of the base portion 10a so as to be substantially perpendicular to the lengthwise portion 10b of the main base. A vertically extending column member 12 is formed with a suitable base 13 carrying spaced gib elements 14 and 15 which are adapted to engage the longitudinal dovetail 11 so as to guide the column 12 along the length of the base portion 10a. A suitable hand wheel 16 is provided to turn a feed screw 17, which feed screw 17 is engaged in a travel nut 18 connected to the column base 13 (FIG. 2) so that the column 12 can be made to move along the base portion 10a. The column 12 carries a vertically traversing base 19 which is guided by a dovetail 20 on the vertical column 12 and by gibs 21 and 22 on the vertically moving base 19. A suitable hand wheel 23 operates a feed screw 24 which engages a suitable nut (not shown) on the base 19 so as to move the latter in a vertical direction.

The vertically movable base 19 is provided with a forwardly projecting housing 25 which is adapted to receive the elongated neck 26 of the motor housing 27 for an electric motor which drives the shaft 28 running through the neck 26 and supported at its outer end on a suitable bearing 29. The electric motor housing 27 is secured to a portion of the vertically moving base 19 and adjacent thereto is a speed controller 30 with a control dial 31 in a position to be available to the operator for controlling the speed of the shaft 28.

The motor shaft 28 is axially bored as at 32 such that an extremely long twist drill D can be received in the usual chuck 33 so that a selected portion of the cutting end of the drill D can be extended and the shank of the drill will then be supported in the axial bore 32.

Thus far there is disclosed drilling apparatus in which an adjustable column 12 can be moved horizontally along a base portion 10a, and a motor driven drill D can be moved vertically by means of a base 19 movable on the column 12, whereby the drill D can be adjusted along horizontal and vertical axes.

The base portion 10b of the present apparatus is provided with parallel horizontal extending waybars 35 and 36 which are suitably clamped in position at support stands 37 at or adjacent the opposite ends of the waybar 35 and similar support stands 37 at the opposite end of the waybar 36. Clamping plates 38 are utilized to retain the waybars 35 and 36 respectively in position. A work supporting table 39 is provided with depending bosses 40 (there being four in number) which are adapted to receive suitable anti-friction bearings 41 which utilize the waybars 35 and 36 respectively as the inner-raceway (FIG. 5). Thus, the work supporting table 39 is operatively mounted on the waybars 35 and 36 so that it will glide with a minimum of friction along these waybars. The work supporting table itself is provided with the usual undercut grooves 42 which are open at the back side of the work table 39 to receive the head portions of clamping bolts 43, and the clamping bolts 43 cooperate with clamping fingers 44 which are brought to bear upon a workpiece W in order to hold it in any desired position. In the illustration depicted in the drawing the workpiece W is arranged to have its longitudinal dimension substantially parallel with the axis of the drill D.

In operation it is understood that the workpiece W will be mounted on the table 39 and that a drill of suitable size will be mounted in the chuck 33 and the cutting end of the drill will be extended outwardly more or less as desired. The hand wheels 16 and 23 will then be respectively manipulated to move the drill D in two planes until the tip of the drill D lines up with the position where a deep bore is to be made in the workpiece W. At this point the operator will start the motor in housing 27 and adjust the speed control unit 30 at the dial 31 to the desired speed for initiating drilling of the hole in the workpiece W. The speed control unit 31 is provided so that the drill D can be started at a sufficiently low speed to prevent whipping which would cause the tip end thereof to follow a circular path because of the bending moment. After a suitable depth of hole has been made in the workpiece W the table 39 can then be adjusted by a suitable stop 45 slidably mounted on the waybar 36 between the bosses 41. The stop 45 is slid along the waybar 36 until it engages the righthand depending boss 41, as viewed in FIG. 2, such that the workpiece W on the table 39 cannot be withdrawn relative to the drill D so as to disengage the tip portion of the drill D from the workpiece W. This setting will establish a support in the workpiece for the tip end of the drill D, and thereafter the workpiece W cannot be moved so as to have the drill D completely withdrawn. At this point the drill can be speeded up to its optimum drilling speed.

Having gone through the preliminary operations as above described, and with the drill D running at optimum speed, the operator thereafter manually manipulates the workpiece W toward the drill D relying on a "feel" to indicate that the drill is binding. At this point the operator withdraws the workpiece W from its advanced position back to the preset stop 45 and allows the drill D to clear itself of the accumulated cuttings. The operator next readvances the workpiece W until the "feel" is developed that the drill is again binding and will require withdrawal so as to clear itself of cuttings. It should now be evident that the operator can successively advance and withdraw the workpiece relative to the drill D to successfully drill the desired deep hole in successive steps while clearing the cuttings between each successive drilling step. The back and forth operation of the workpiece relative to the drill D is, of course, controlled by the stop 45 so that it is not necessary to completely withdraw the work from the drill or to slow the speed of the drill each time. The spacing between the bearing carrying bosses 41 under the table 39 can be selected such that the table 39 has a suitable length of stroke relative to the drill D from whatever starting position is selected by the adjustable stop 45. This feature is particularly important as the usual drilling apparatus has a fixed work carrying table and a movable drill chuck. In this prior art apparatus there is no room to handle deep drilling work.

The foregoing apparatus can be utilized for drilling a wide variety of materials from the relative soft materials, like carbon and the non-ferrous group to relatively hard materials, like metals and alloys. When the apparatus is used for drilling the relatively harder materials it has been found that it is difficult by manual "feel" to determine just when the drill D begins to bind on the cuttings. Therefore, the operator is given a visual indication of how deep to go on each successive drilling thrust into the workpiece W by means of a gage G which is mounted on a bracket 46 attached to the base 10 with its feeler arm 47 extended outwardly so as to be engaged by the tip end 48 of a gage actuating rod 49. The rod 49 is supported in a suitable bracket 50 and held in position by a clamping screw 51. Thus, the rod 49 can be adjusted toward or away from the gage arm 47 to suit the position of the workpiece W on the table 39. In operation, as the workpiece W is advanced toward the drill D the tip 48 of the rod 49 will engage the arm 47 on the gage G and the operator can then advance the workpiece as desired (a movement of the order of between five and ten thousandths can be used as an average) after which the workpiece is withdrawn against the present stop 45 to clear the cuttings. In apparatus arranged as described the drill can be run at the optimum speed for the character of drill and the material of the workpiece W.

The "feel" referred to above is more precisely one in which the operator first senses by finger touch that the drill tip has engaged the bottom of the bore and next that the bite of the drill is loading the drive motor which means that cuttings are causing increased resistance to drill rotation. The resistance to easy drill operation can cause breakage, especially with drills of the small sizes employed in some work. In the example of FIG. 7, the gage G may also be used to give a visual report on how fast the drill is fed into a bore by the rate of movement of the gage needle. Thus the operator can with experience develop a touch for feeding the drill at a uniform rate through a desired distance at each drilling stroke.

It should now be understood from the foregoing description and the disclosure in the drawings that the drilling apparatus performs all of the objects above enumerated.

What is claimed is:

1. A method of deep bore hand drilling of a workpiece which includes adjusting the relative positions of the workpiece and the drill to align the drill to the axis of the bore to be made, initially manually moving the workpiece and drill relative to each other in the axis of the bore for forming an initial portion of the bore with the drill driven at low speed, fixing the relative axial location of the workpiece and drill to maintain the lead end of the drill within the initially formed bore portion, increasing the drill speed to substantially optimum for the material of the workpiece and thereafter successively and manually relatively moving the workpiece and drill to increase the depth of the bore in small increments of penetration of the workpiece and manually monitoring the cutting action of the drill advancing in the bore whereby the drill may be withdrawn up to the lead end without losing bearing contact and to clear the drill of cuttings until the desired bore depth is reached.

2. The method of deep bore drilling of a workpiece as set forth in claim 1 and which includes initially short chucking a drill in a powered chuck with a part only of the drill projecting from the chuck, lengthening the exposed end of the drill with increase of the depth of the bore into the workpiece, whereby drill whip relative to the workpiece during boring is substantially controlled.

References Cited

UNITED STATES PATENTS

| | | | |
|---|---|---|---|
| 3,158,043 | 11/1964 | Burgsmueller | 77—5 |
| 3,416,580 | 12/1968 | Walter | 144—92 |
| 3,045,727 | 7/1962 | Clarke | 77—63 XR |
| 2,908,978 | 10/1959 | Knosp et al. | 77—63 XR |
| 2,488,620 | 11/1949 | Evenstad et al. | 77—32.3 XR |
| 2,824,470 | 2/1958 | Groves | 77—5 |
| 2,343,164 | 2/1944 | Woszczyna | 77—5 |

FOREIGN PATENTS

| | | |
|---|---|---|
| 694,632 | 7/1953 | Great Britain. |
| 369,002 | 4/1963 | Switzerland. |

FRANCIS S. HUSAR, Primary Examiner

U.S. Cl. X.R.

77—32.3; 144—107